(12) United States Patent
Casey et al.

(10) Patent No.: US 8,300,844 B2
(45) Date of Patent: Oct. 30, 2012

(54) AUDIBLE FEEDBACK OF MACHINE LOAD

(75) Inventors: Kent A. Casey, Washington, IL (US);
Norval P. Thomson, Dunlap, IL (US);
Vernon R. Smith, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1852 days.

(21) Appl. No.: 11/446,213

(22) Filed: Jun. 5, 2006

(65) Prior Publication Data

US 2007/0147626 A1    Jun. 28, 2007

Related U.S. Application Data

(60) Provisional application No. 60/753,403, filed on Dec. 27, 2005.

(51) Int. Cl.
*H04B 1/00* (2006.01)
(52) U.S. Cl. ............. 381/86; 381/61; 381/62; 701/22; 434/29; 434/34
(58) Field of Classification Search ............. 381/61–62, 381/58, 86; 701/22; 434/29, 34
See application file for complete search history.

(56) References Cited

U.S. PATENT DOCUMENTS

| 4,916,900 | A | | 4/1990 | Iino et al. |
| 5,371,802 | A | | 12/1994 | McDonald et al. |
| 5,415,550 | A | * | 5/1995 | Aoki et al. ................ 434/61 |
| 5,966,452 | A | * | 10/1999 | Norris ...................... 381/71.1 |
| 6,751,534 | B2 | * | 6/2004 | Robichaux et al. ........... 701/22 |
| 6,783,195 | B1 | * | 8/2004 | Grabsch ...................... 303/191 |
| 6,859,539 | B1 | * | 2/2005 | Maeda ......................... 381/86 |
| 6,959,094 | B1 | * | 10/2005 | Cascone et al. .............. 381/86 |
| 7,466,832 | B2 | * | 12/2008 | House ......................... 381/107 |
| 7,764,800 | B2 | * | 7/2010 | Maeda ......................... 381/86 |
| 2003/0086577 | A1 | * | 5/2003 | Lee ............................ 381/97 |
| 2003/0144105 | A1 | * | 7/2003 | O'Hora ...................... 475/193 |
| 2003/0152893 | A1 | * | 8/2003 | Edgar ......................... 434/37 |
| 2004/0044459 | A1 | * | 3/2004 | Wakao et al. ................ 701/69 |
| 2004/0238261 | A1 | * | 12/2004 | Kodama et al. ............. 180/443 |
| 2005/0013449 | A1 | * | 1/2005 | Kowaki ..................... 381/94.7 |
| 2005/0154505 | A1 | * | 7/2005 | Nakamura et al. ............ 701/1 |
| 2005/0226449 | A1 | * | 10/2005 | Young ........................ 381/333 |
| 2005/0278104 | A1 | * | 12/2005 | Masuda et al. .............. 701/69 |
| 2006/0014608 | A1 | * | 1/2006 | Mitchell et al. ............. 477/107 |
| 2007/0086879 | A1 | * | 4/2007 | Goodrich et al. ........... 414/537 |

(Continued)

FOREIGN PATENT DOCUMENTS

DE            9005598         7/1990

(Continued)

*Primary Examiner* — Disler Paul
(74) *Attorney, Agent, or Firm* — Finnegan, Henderson, Farabow, Garrett & Dunner LLP

(57) ABSTRACT

A sensor is provided in a machine having a continuously variable transmission, for example, and the amount of force exerted by the machine against a load is sensed. Based on the sensed power, an appropriate audio signal is generated which simulates the sounds an operator would expect to hear when such force is applied with a machine having a conventional geared transmission. The sounds can include engine noises, as well as sounds associated with the flow of oil or other hydraulic fluids. In addition, the sounds can be generated from digitally pre-recorded audible data, or can be output based on calculated audible data. User controls are also provided to adjust the volume and frequency or pitch of the generated sounds.

23 Claims, 11 Drawing Sheets

U.S. PATENT DOCUMENTS

2007/0147626 A1 6/2007 Kent et al.

FOREIGN PATENT DOCUMENTS

| | | |
|---|---|---|
| DE | 19746523 | 5/1998 |
| DE | 19831576 | 1/2000 |
| DE | 19859712 | 6/2000 |
| DE | 19911335 | 9/2000 |
| DE | 19951558 | 5/2001 |
| JP | 61278431 | 12/1986 |
| JP | 08049262 | 2/1996 |
| JP | 01958257 | 6/1997 |
| WO | WO 90/13109 | 11/1990 |

* cited by examiner

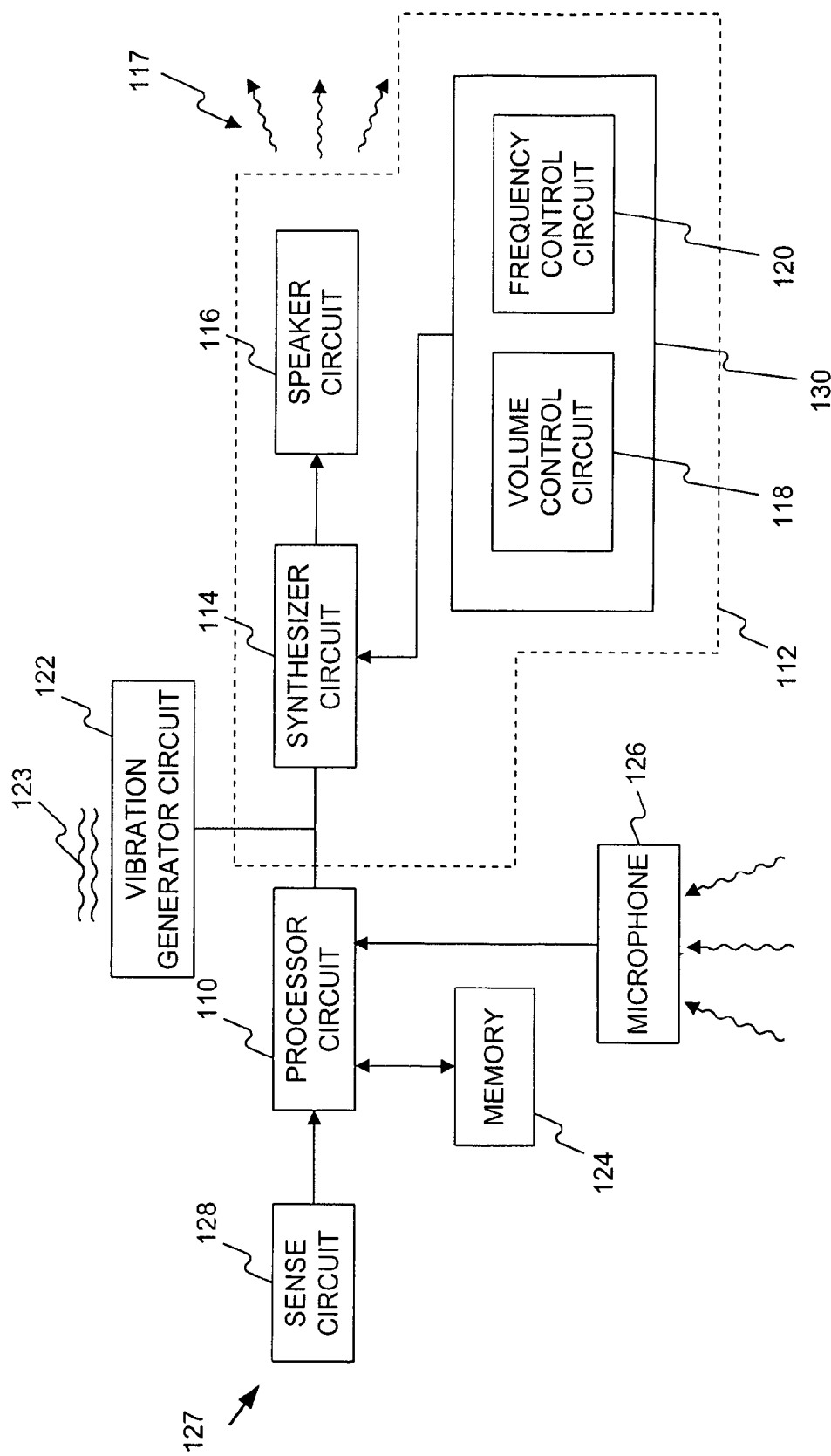

AUDIBLE FEEDBACK OF MACHINE LOAD

This application claims the benefit of prior U.S. Provisional Patent Application No. 60/753,403, filed Dec. 27, 2005, the contents of which are incorporated herein by reference.

TECHNICAL FIELD

The present disclosure is directed toward a system and related method for generating an audible indicator of a load or resistive force placed on an engine or other power source.

BACKGROUND

As generally understood, an internal combustion engine, for example, operates over a narrow range of speeds. Accordingly, a transmission is typically provided between the engine and an implement, such as a vehicle wheel or the bucket of an earth moving machine, so a wide range of torques can be applied to the implement. Many current transmissions, as well as earlier ones, include a series of gears, whereby one or more gears within the transmission are selected depending on load conditions. For example, as a vehicle initially accelerates, the engine speed is increased and the transmission selects a higher gear ratio (the ratio between the engine speed to wheel speed) which delivers a higher torque to the wheels. As the vehicle speed approaches a desired speed and less torque is required, the transmission shifts to a lower gear ratio.

Automatic transmissions are known which do not require manual selection of transmission gears. Typically, automatic transmissions include a torque converter, which selectively allows the engine to run independently of the transmission. If the engine is running at a slow speed, the amount of torque passed through the torque converter to the implement is relatively small. When the engine speed increases, however, more torque is transmitted to the implement. Accordingly, operators of machines having automatic transmission are accustomed to hearing the engine speed increase when additional output power or torque is required to be applied against a load.

More recently, however, so-called continuously variable transmissions ("CVTs") have become commercially available which continuously adjust the gear ratio, so that the engine maintains an optimal speed regardless of the load. One such CVT is described in U.S. Pat. No. 4,916,900.

Machines having a CVT typically do not have a torque converter, and the engine in such machines can remain at a substantially constant speed while the torque applied to the implement is varied. Thus, although CVTs can improve fuel economy, the operator of such machines typically does not hear the engine rev or feel machine vibrations, as would be expected when greater torque is required to act against an increased load. The operator may then attempt to overcompensate for the apparent lack of engine power, even though such overcompensation is not necessary and could be detrimental.

In addition, with load sensing hydraulics and improved transmissions, the cabs of earthmoving machines have become quieter such that operators may lose noise feedback that they would otherwise rely on to gauge the amount of force delivered by the machine.

The present disclosure is directed to overcome one or more of the shortcomings in the prior art.

SUMMARY OF THE INVENTION

Consistent with an aspect of the present disclosure, a system is provided for outputting an audible signal simulating a mechanical noise, the audible signal corresponding to an output power generated by a machine against a load. The system includes a processor circuit and an audio output circuit. The processor circuit is configured to receive an input signal associated with the output power and output audible signal data based on the input signal. The audio output circuit is coupled to the processor circuit and is configured to generate the audible signal in response to the audible signal data.

Consistent with an additional aspect of the present disclosure, a method for outputting an audible signal simulating a mechanical noise is provided. The audible signal corresponds to the output power generated by a machine against a load. The method includes receiving an input signal associated with the output power and generating audible signal data based on the input signal. The method further includes generating the audible signal in response to the audible signal data.

Consistent with a further aspect of the present disclosure, a machine is provided which is configured to operate on a load. The machine includes a power source, and a transmission coupled to the power source. In addition, an implement is coupled to the transmission and the load, the transmission being configured to deliver an output power to the implement and against the load. A processor circuit is also provided which is configured to receive an input signal associated with the output power and generate audible signal data based on the input signal. Further, an audio output circuit is provided which is coupled to the processor circuit. The audio output circuit is configured to generate the audible signal in response to the audible signal data. The audible signal simulates a mechanical noise.

Also, consistent with the present disclosure, a system is provided for outputting an audible signal simulating a mechanical noise. The system includes a machine having a transmitter circuit, a receiver circuit remote from the machine, a processor coupled to the receiver circuit, and an audio output circuit coupled to the processor circuit. The transmitter circuit transmits a signal carrying information related to a power output from the machine to manipulate a load. The receiver circuit is configured to receive the signal and output the information, and the processor circuit is configured to output audible signal data based on the information. In addition, the audio output circuit is configured to generate the audible signal in response to the audible signal data.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 illustrates a block diagram of a system consistent with an aspect of the present disclosure;

DETAILED DESCRIPTION

Figure 2A:
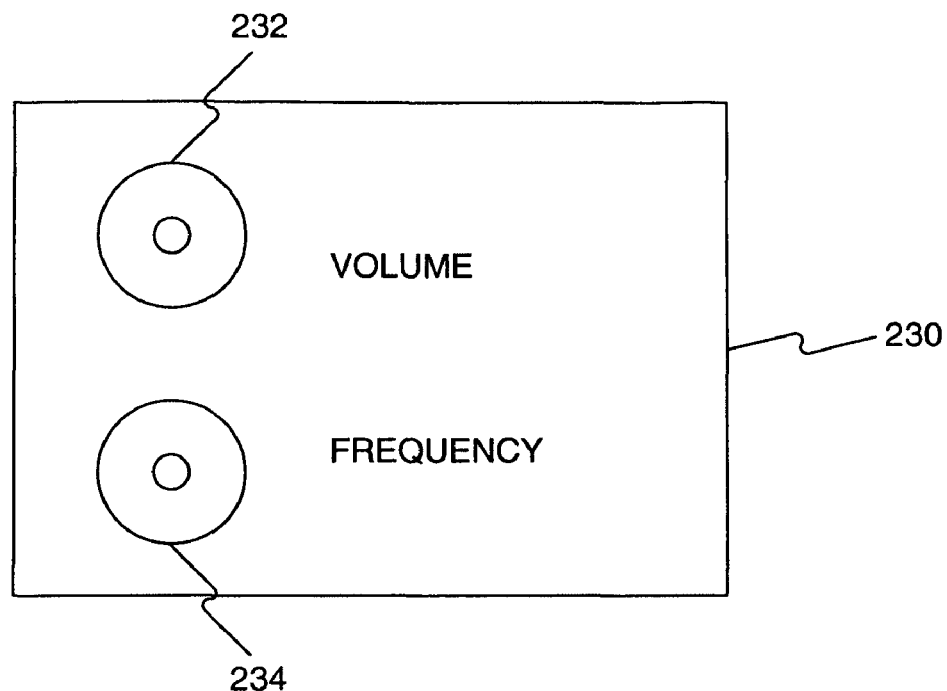
FIGS. 2a and 2b illustrate exemplary user control panels consistent with an additional aspect of the present disclosure.

Reference will now be made in detail to exemplary embodiments of the invention, which are illustrated in the accompanying drawings. Wherever possible, the same reference numbers will be used throughout the drawings to refer to the same or like parts.

FIG. 1 illustrates a system 100 that outputs simulated mechanical noises or sounds as audio signals 117. System 100 optionally includes a sense circuit 128 configured to sense a machine force parameter signal 127 associated with the output force of a machine. The parameter may include one or more of the following: speed, of either of a vehicle, engine, wheels or transmission component; an amount of load, either placed on an engine or a machine implement; measured torque; and relative speed.

Sense circuit 128 supplies an input signal to processor circuit 110 in response to the sensed parameter, which may include hydraulic pressure or electrical current, as discussed in greater detail below. Processor circuit 110, which includes for example, a conventional microprocessor, outputs audible signal data based on the input signal to an audio output circuit 112. The audible signal data may be retrieved by processor circuit 110 from a memory 124. Alternatively, the audible signal data may be calculated by processor circuit 110.

The audible signal data, which is typically in the form of a digital signal, is supplied to a synthesizer circuit 114 of audio output circuit 112. Synthesizer circuit 114 includes conventional digital-to-analog (D/A) conversion circuitry, for example, for generating a corresponding analog signal. Synthesizer circuit 114 supplies the analog signal to a speaker circuit 116, typically also in audio output circuit 112. In response to the received analog signal, speaker circuit 116 outputs audio signals 117 (the first audible signal) simulating mechanical sounds, such as engine noises, noises associated with a power train, or sounds generated by machine hydraulics, which are associated with the output force of the machine when acting on particular load. These sounds are substantially the same sounds having substantially the same change in tone or volume that an operator would expect to hear if the engine speed, for example, increased while additional output force (e.g., torque) is applied to a load. Alternatively, other mechanical sounds can be generated, such as sounds having increased frequency to simulate increased vehicle speed or lower frequency to emulate the sounds generated as a vehicle slows down.

Figure 2B:
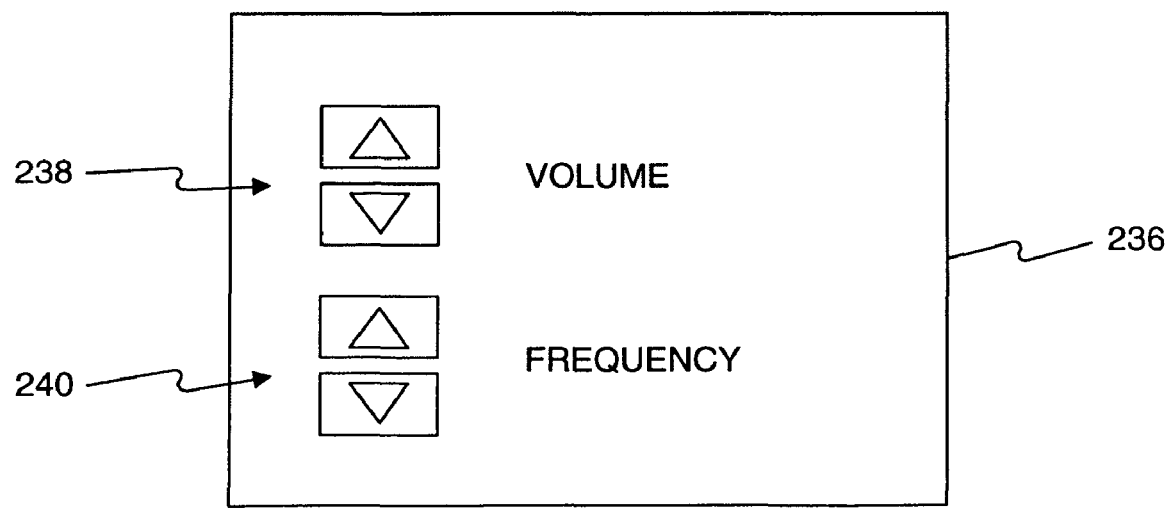
Figure 3:
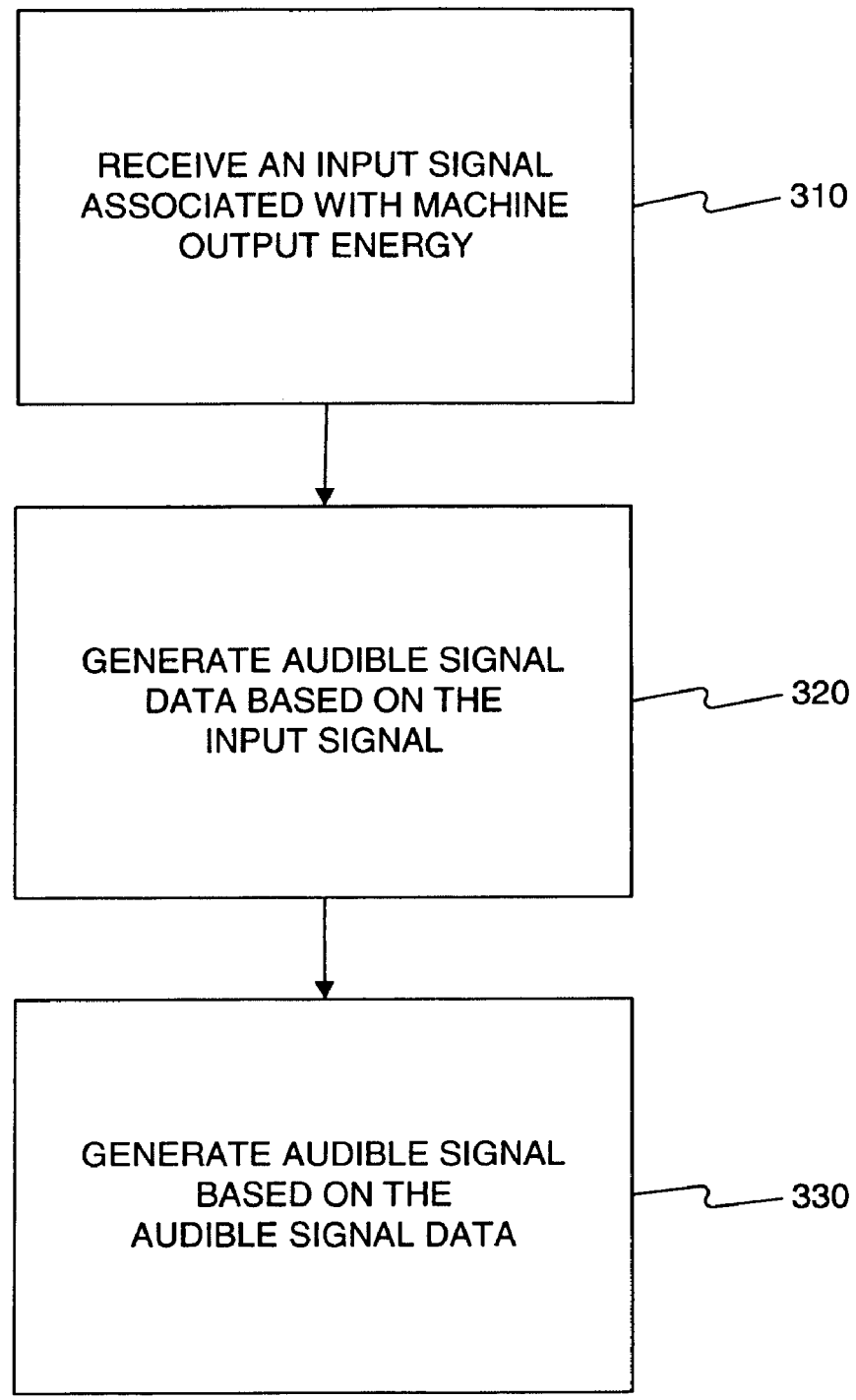
FIG. 3 illustrates a flowchart consistent with a further aspect of the present disclosure.
Figure 4:
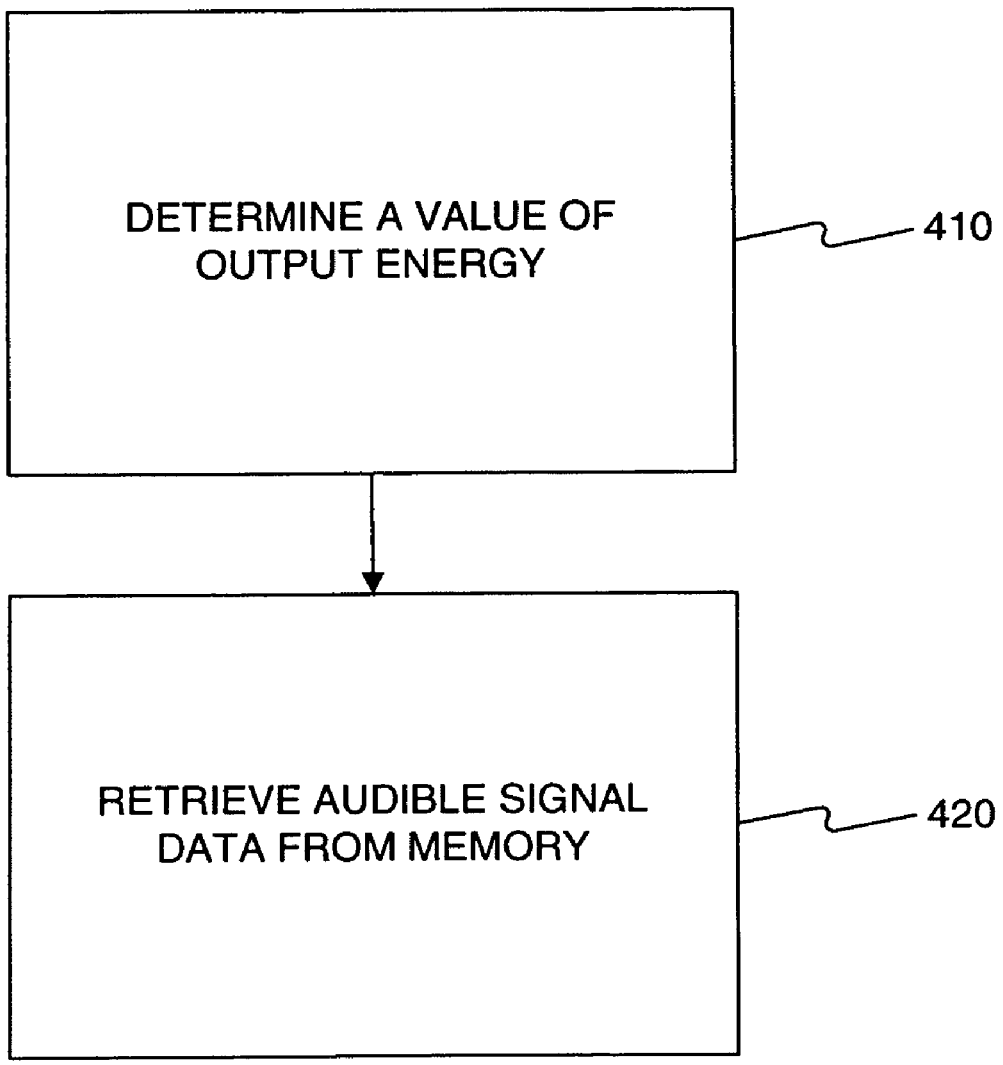
FIG. 4 illustrates a flow chart consistent with an additional aspect of the present disclosure.

As further shown in FIG. 1, an audio control circuit 130 may be provided which is coupled to synthesizer 114. An audio control circuit 130 typically includes a volume control circuit 118 and a frequency control circuit 120 for modifying the volume and pitch, respectively, of the analog signal to the speaker circuit 116. FIG. 2a illustrates a user control panel 230 having knobs 232 and 234 to permit the operator to manually adjust the audio signal volume and frequency, respectively. Knobs 232 and 234 are coupled to circuits 118 and 120, respectively. FIG. 2b shows an alternative user control panel 236 having keys 238 and 240 also for controlling the audio signal volume and frequency, respectively. Keys 238 and 240 may be coupled to circuits 118 and 120, respectively.

As further shown in FIG. 1, the audible signal data may also be supplied to a vibration generator circuit 122, which generates vibrations 123 in the machine in response to the received audible signal data. Vibration generator circuit 122 may include known oscillator circuits that create vibrations similar to those created by an engine applying additional output force or torque to a load. Such vibrations, however, may be localized to the operator's seat or mechanical controls, such as a joystick, and need not propagate throughout the machine. Preferably, the vibrations are sufficient to provide the operator with additional sensations of an engine expending additional power, even though such additional force may not be output from the engine itself.

In addition, as shown in FIG. 1, a microphone 126 may be provided to facilitate so-called "active noise control." Namely, undesired noises (a second audible signal), such as unwanted engine noise, may be sensed with microphone 126. The microphone, in turn, supplies a second input signal to processor circuit 110, which, in turn, incorporates interference data into the audible signal data. As a result, audible signal 117 may include a component signal which interferes with the undesired noise, thereby substantially reducing its intensity. Active noise control consistent with the present disclosure is discussed in greater detail below.

A method for outputting an audible signal simulating a mechanical noise will next be described with reference to FIGS. 3-6b. In flowchart 300 shown in FIG. 3, the method includes a first step 310 in which processor circuit 110 receives an input signal associated with machine output force. As noted above, the input signal is associated with the machine output force, and constitutes, for example, a hydraulic pressure measurement or a sensed electrical current. In step 320, processor 110 generates or outputs audible signal data based on the input signal. The audible signal data is supplied to audio output circuit 112, which, in turn, outputs the audible signal (step 330).

As further noted above, audible signal data may be retrieved by processor circuit 110 from memory 124. In that case, as indicated in flowchart 400 shown in FIG. 4, processor circuit 110 determines a value or magnitude of output force based on the input signal (step 410). Then, in step 420, the output force value is used to look-up corresponding audible data stored in memory 124. The audible data may include, for example, digitally pre-recorded sound data or other information which can be used by processor circuit 110 and/or synthesizer circuit 114 to output an audio signal corresponding to a sensed output force.

Figure 5:
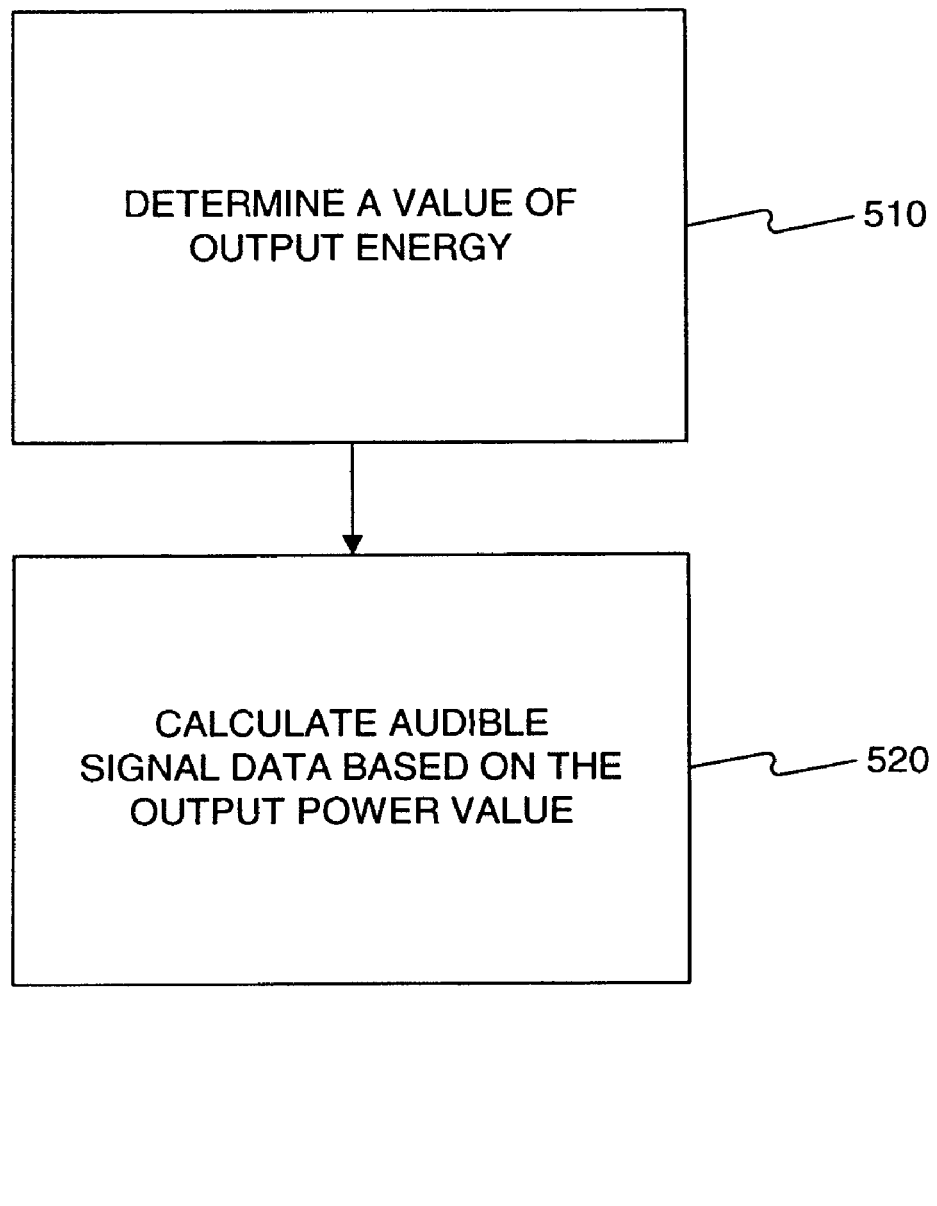
FIG. 5 illustrates a flow chart consistent with another aspect of the present disclosure.

Alternatively, as shown in flowchart 500 of FIG. 5, after the value of output force is determined (step (510), processor 110 calculates audible signal data based on the output force value (step 520).

Figure 6A:
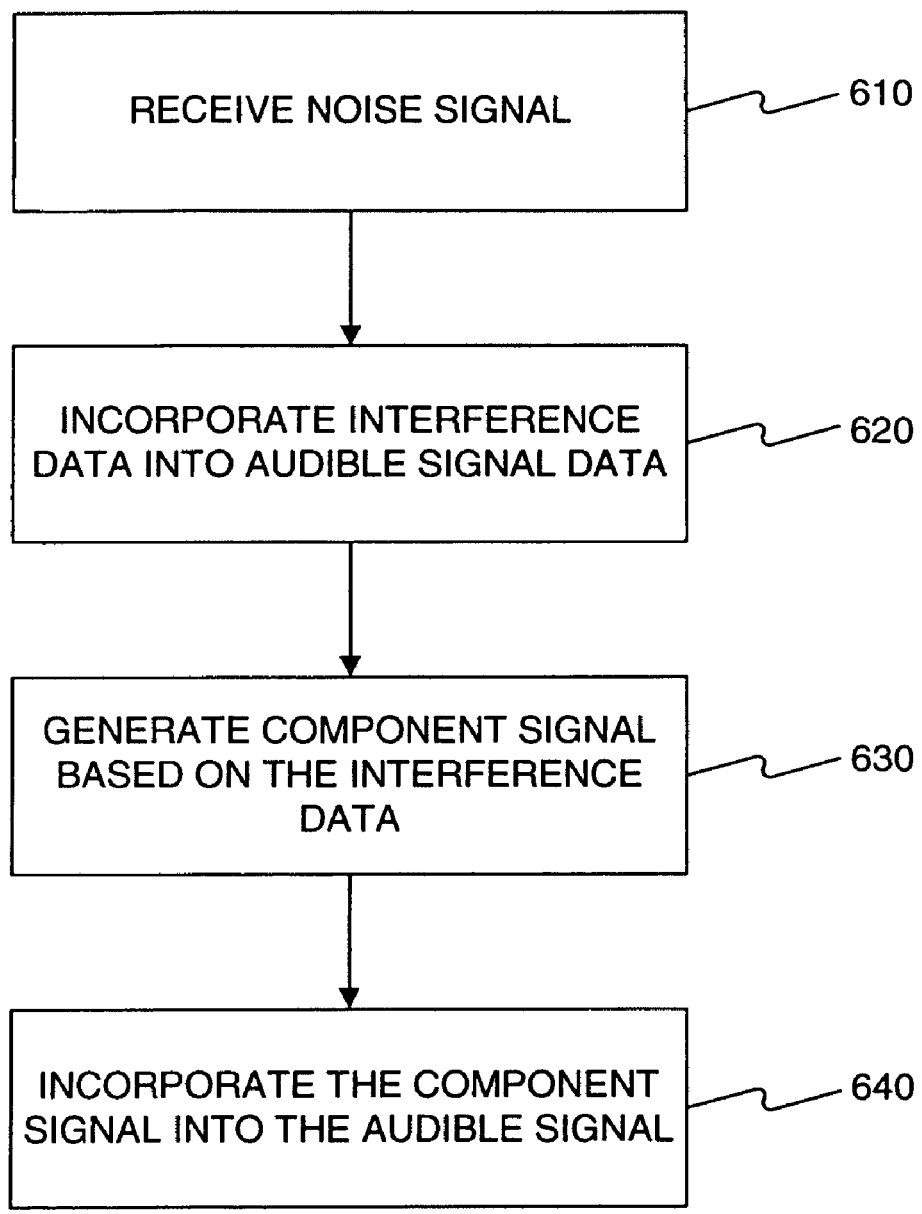
FIG. 6a illustrates a flow chart consistent with a further aspect of the present disclosure.
Figure 6B:
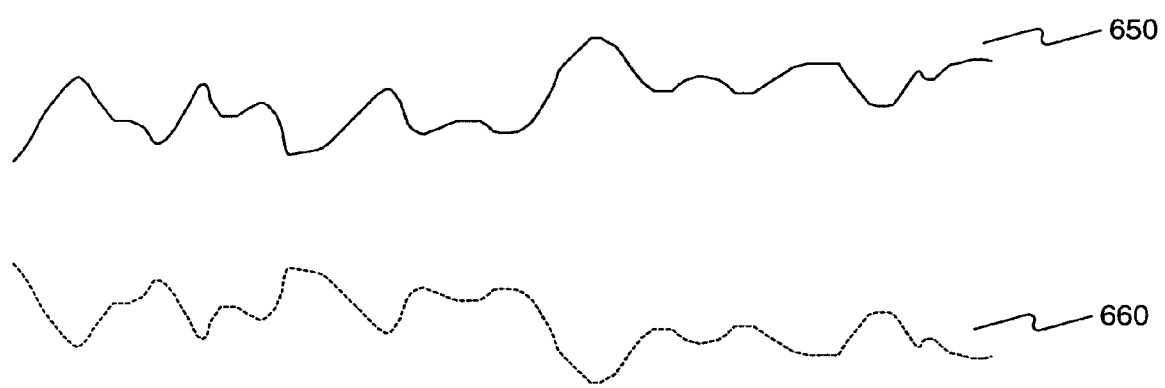
FIG. 6b illustrates a composite signal consistent with an additional aspect of the present disclosure.

A method of performing active noise control will next be described with reference to flowchart 600 in FIG. 6a. In step 610 of flowchart 600, an undesired noise signal is received and sensed with microphone 126, for example. Processor 110 receives data associated with the sensed noise signal and calculates interference data in response thereto. In step 620, the interference data is incorporated into the audible signal data supplied to synthesizer circuit 114, which outputs an analog signal as discussed above. In response to the received analog signal, speaker circuit 116 generates an audio signal incorporating a component signal represented by dashed curve 660 in FIG. 6b.

Preferably, component signal 660 is of sufficient frequency, phase, and magnitude so as to constitute the inverse or reciprocal of unwanted noise signal 650. As a result, signals 650 and 660 destructively interfere with one another, and the level or intensity of noise signal 650 is reduced. Thus, in addition to generating audio signals mimicking an expected mechanical noise, undesired noise can be minimized in accordance with an additional aspect of the disclosure.

Industrial Applicability

As discussed above, a sensor is provided in a machine and the amount of force exerted by the machine against a resistive force or load is determined. Based on the amount of machine output power, an appropriate audio signal is generated which simulates the sounds an operator would expect to hear when such force is applied with a machine having a conventional geared transmission. The sounds can include engine noises, as well as sounds associated with the flow of oil or other hydraulic fluids. In addition, the sounds can be generated from digitally pre-recorded audible data, or can be output based on calculated audible data. User controls may be provided to adjust the volume and frequency or pitch of the generated sounds.

Figure 7A:
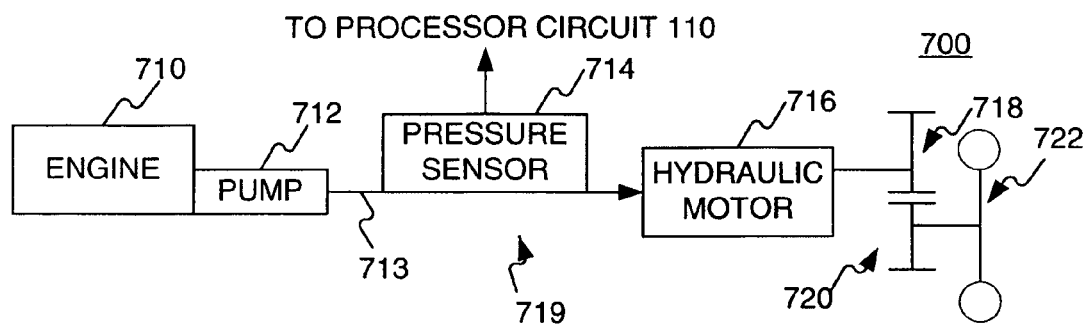
FIGS. 7a-7c illustrate block diagrams of machines consistent with further aspects of the present disclosure.

Examples of applications of the present disclosure to various machines will next be described with reference to FIGS. 7a-7c, 9a, 9b, and 10. As shown in FIG. 7a, machine 700 includes a power source, such as an internal combustion engine 710 and a transmission 719 including a hydraulic pump 712, hydraulic motor 716, and gears 718 and 720. Engine 710 drives pump 712, which supplies hydraulic fluid, as represented by arrow 713 to hydraulic motor 716. Hydraulic motor 716 turns gear 718, which, in turn, drives gear 720. Gear 720 is coupled to wheels 722. Transmission 719 is a continuously variable transmission.

As further shown in FIG. 7a, a pressure sensor circuit 714 is provided to sense the pressure of hydraulic fluid output from pump 713. The sensed or measured pressure data is supplied to processor circuit 110 as an input signal. Based on the measured pressure (P), processor circuit 110 calculates the output power or, in this example, the wheel torque (T), in accordance with the following:

$$T = \eta \times ((P \times MD)/2\pi) \times (G2/G1),$$

where $\eta$ is a proportionality constant, MD is the displacement of hydraulic motor 716, G1 is the number of teeth of gear 718, and G2 is the number of teeth of gear 720. The load placed on engine 710, in this example, corresponds to the amount of torque T, as calculated above. Thus, by measuring the pressure output from hydraulic fluid output from pump 713, the amount of output power or torque, and thus the load placed on engine 710 can be determined by processor circuit 110. As noted above, such information is used, consistent with the present disclosure, to generate audible signal data used to simulate mechanical sounds expected by the operator.

Figure 7B:
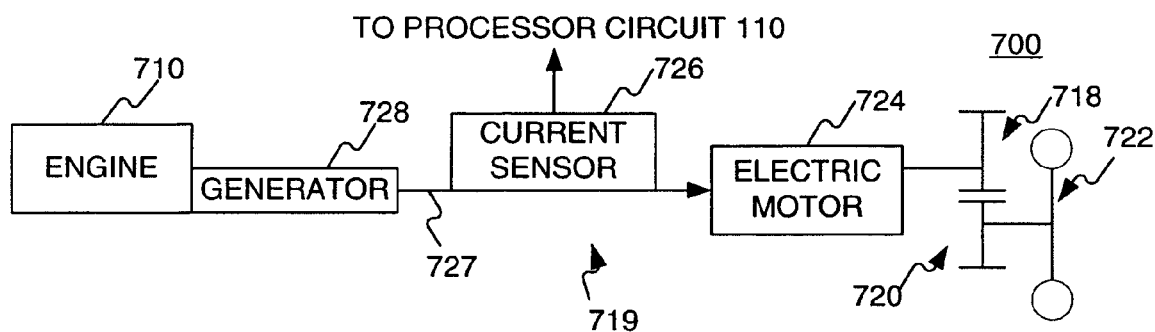

FIG. 7b illustrates another example of machine 700. Instead of a hydraulic system, as described with reference to FIG. 7a, transmission 719 includes an electric motor 724 that drives wheels 722 in response to an electrical current (represented by arrow 727) output from generator 728. In this example, a current sensor 726 outputs a sensed or measured current to processor circuit 110. Based on the measured current, the torque applied to wheels 722 is determined in order to output an appropriate audible signal data.

Figure 7C:
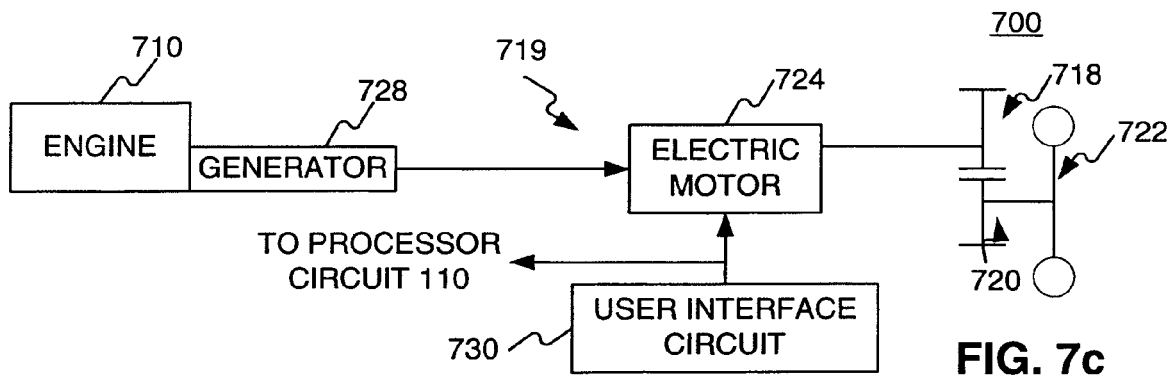

Machine 700 shown in FIG. 7c is similar to that shown in FIG. 7b, but current sensor 726 is omitted. In the example shown in FIG. 7c, the output power is determined by processor circuit 110 based on electric motor control signals output from user interface circuit 730.

Figure 8:
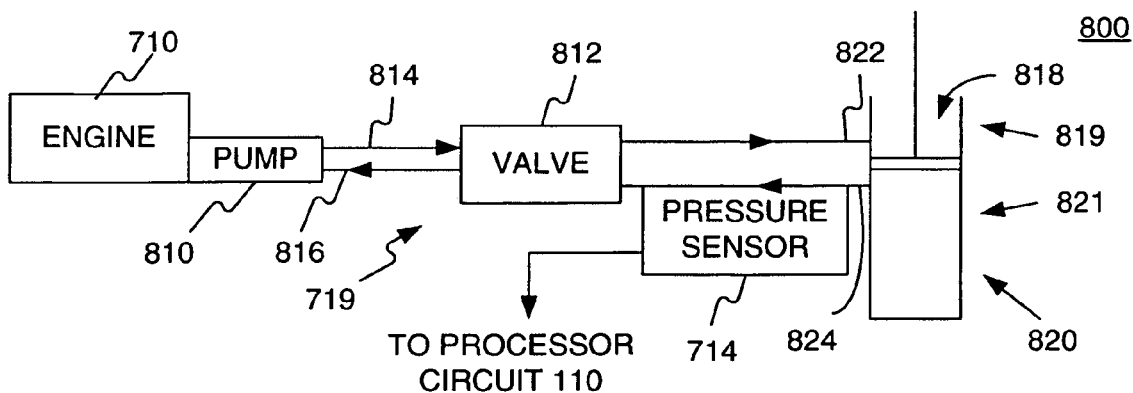
FIG. 8 illustrates a block diagram of a machine consistent with other aspects of the present disclosure.

FIG. 8 illustrates another exemplary machine including an engine 710, and a transmission 719 including pump 810, which supplies hydraulic fluid (represented by arrow 814) to a valve 812. In order for piston 818 to move down in FIG. 8, valve 812 is configured to direct hydraulic fluid represented by arrow 822 to upper portion 819 of cylinder 820. Fluid output from cylinder 820 returns to pump 810 through valve 812 as further represented by arrows 816 and 824. In order to raise piston 818, valve 812 is reconfigured such that hydraulic fluid flows in the opposite direction as that discussed above. In particular, hydraulic fluid flows into lower portion 821 of cylinder 820 and out of upper portion 819.

Consistent with a further aspect of the present disclosure, processor circuit 110 may receive input signals associated with the output force applied against more than one load to generate audio signals 117. For example, in a machine having both generator 728 and pump 712 shown in FIGS. 7a and 7b, respectively, input signals may be supplied from both pressure sensor 714 and current sensor 726 to processor circuit 110. Alternatively, multiple input signals can also be generated in machines two or more other configurations shown FIGS. 7a-7c and 8. Upon receipt of such multiple input signals, processor circuit 110, in turn, outputs appropriate audible signal data corresponding to the total output force applied by machine across all the loads, so that appropriate audible signals 117 can be generated.

In the machine shown in FIG. 8, pressure sensor 714 is provided to measure the pressure of hydraulic fluid output from lower portion 821 of cylinder 820. Based on the measured pressure (P), processor circuit 110 calculates the output force (L) as follows:

$$L = A \times P,$$

where A is the area associated with piston 818. Once the output force is determined, output power can be obtained to generate corresponding audible signal data. As noted above, the audible signal data is used to output simulated mechanical sounds or noises.

Figure 9A:
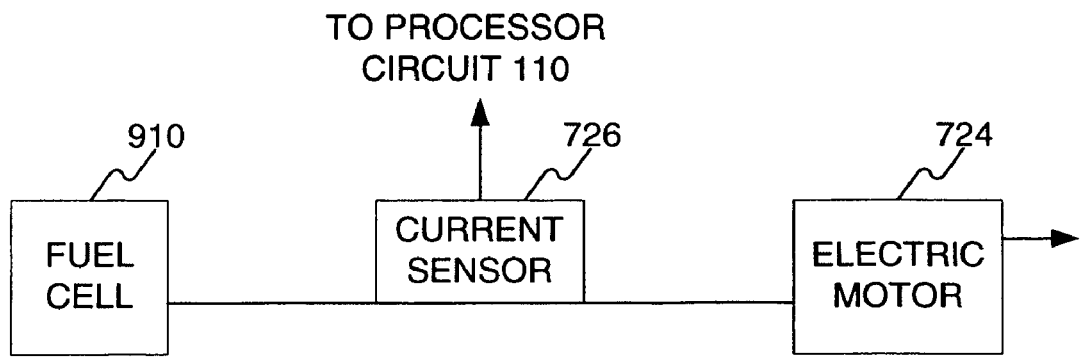
FIGS. 9a and 9b illustrate additional machines consistent with an aspect of the present disclosure.
Figure 9B:
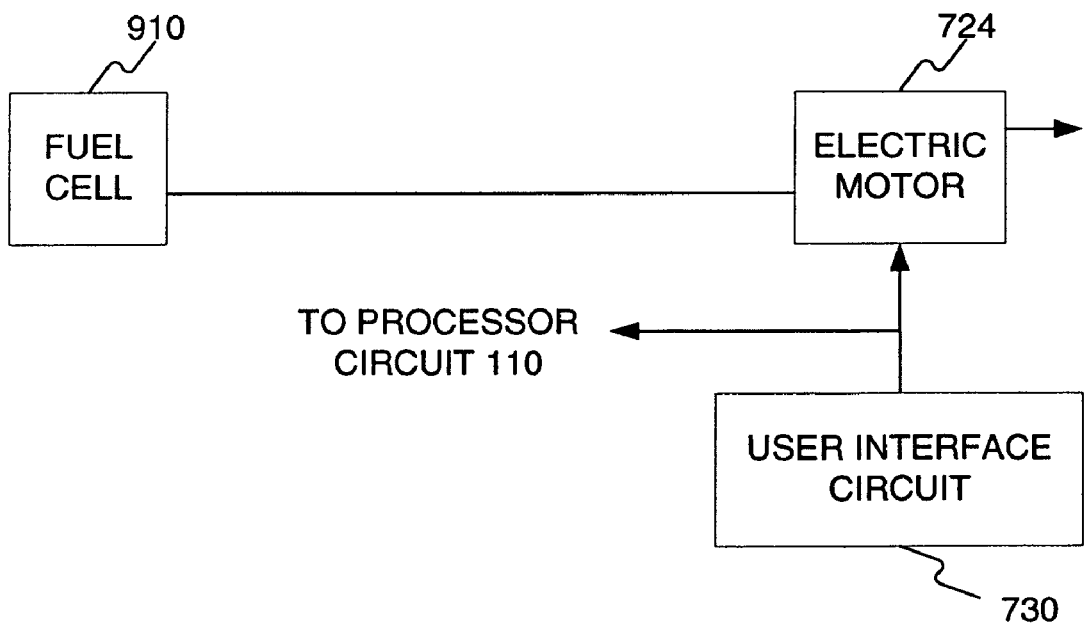

FIGS. 9a and 9b illustrate additional machines in which engine 710 and generator 728 in FIGS. 7b and 7c are replaced by a fuel cell 910. In FIGS. 9a and 9b, input signals in the form of either a sensed current (FIG. 9a) or user control signal from user interface circuit 730 (FIG. 9b) are supplied as input signals to processor circuit 110 to generate appropriate audible signal data.

Figure 10:
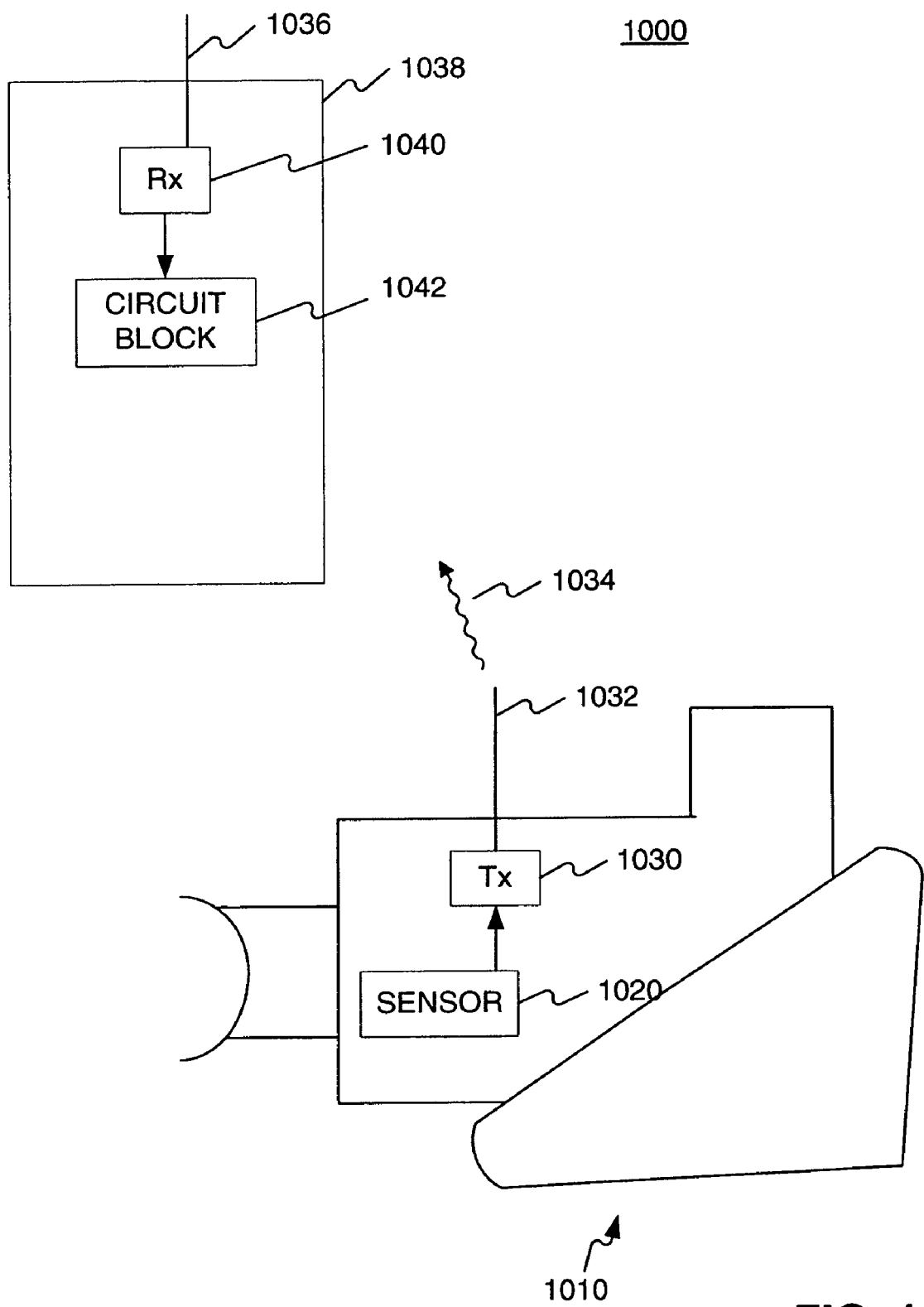
FIG. 10 illustrates a system consistent with a further aspect of the present disclosure.

FIG. 10 illustrates a system 1000 in which a load sensor 1020 and machine 1010 are remote from the operator. In this example, sensor 1020 feeds load or torque-related data such as hydraulic pressure or electrical current data to a transmitter 1030. Transmitter 1030 transmits a signal 1034 carrying such data or information with antenna 1032. At remote location 1038, the signal is received by antenna 1036, which is coupled to a receiver circuit 1040. Receiver circuit 1040 outputs the received information to a circuit block 1042, including processor circuit 110 and audio output circuit 112. As a result, audible signals are generated by circuit block 1042 in a manner similar to that discussed above.

Figure 11:
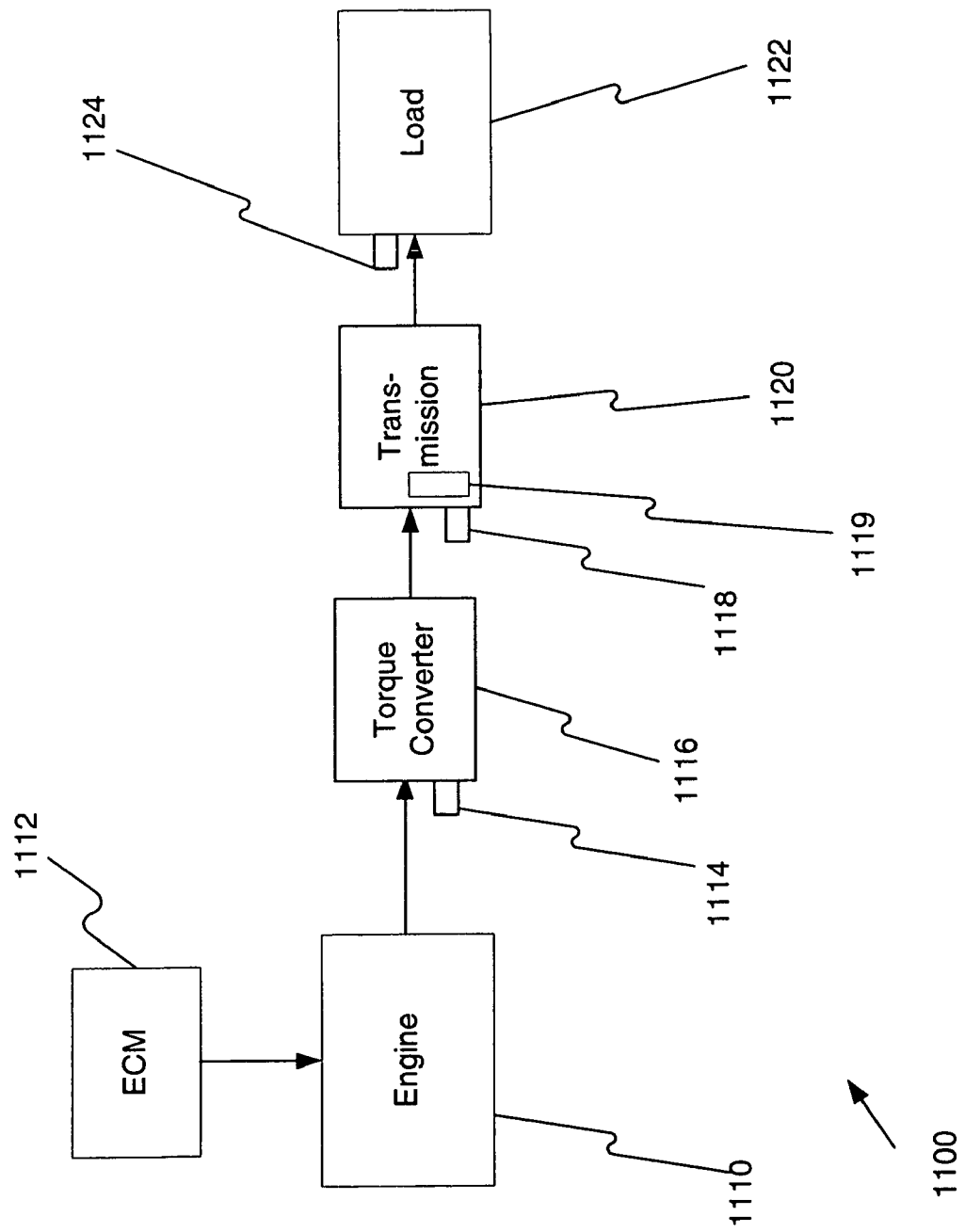
FIG. 11 illustrates locations of sensors consistent with an additional aspect of the present disclosure.

FIG. 11 illustrates examples of locations of where sensors 1114, 1118, and 1124 may be placed to sense various machine parameters and generate corresponding input signals to processor circuit 110. In particular, sensor 1124 may be provided to generate input signals corresponding to the measured torque or force placed on load 1122. If load 1122 constitutes a vehicle wheel, sensor 1124 may output input signal corresponding to the speed of the wheel or a vehicle. Sensor 1124 may also provide an input signal corresponding to the amount of load 1122. Sensor 1118 may also be provided in order to generate input signals corresponding to the speed of one or more components 1119 within transmission 1120. If a torque converter 1116 is provided, input signals may also be generated by both sensors 1114 and 1118 to provide data related to a relative speed, i.e., a ratio of the rotational speed at the engine side of torque converter 1116 to the transmission side of torque converter 1116. Based on such relative speed, output force may be determined.

In addition, a known engine control module 1112, including mircoprocessor circuits, for example, monitor parameters as engine load or engine speed. Thus, engine control module 1112 may be appropriately configured to output such engine load data as an alternative input signal to processor circuit 110.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A system for outputting an audible signal simulating a mechanical noise, the audible signal corresponding to an output force generated by a machine against a load, the system comprising:
   a machine configured to generate an output force against a load;
   a sense circuit including a pressure sensor configured to sense a pressure of a hydraulic fluid, the pressure being associated with the output force;
   a processor circuit coupled to the sense circuit, the processor circuit being configured to receive an input signal from the sense circuit in response to the sensed pressure and output audible signal data based on the input signal;
   an audio output circuit coupled to the processor circuit, the audio output circuit being configured to generate the audible signal in response to the audible signal data; and
   a vibration generator circuit coupled to the processor circuit, the vibration generator circuit being configured to generate vibrations in the machine in response to the audible signal data.

2. A system in accordance with claim 1, further including a memory configured to store the audible signal data, the processor circuit being configured to retrieve the audible signal data from the memory based on the output force.

3. A system in accordance with claim 1, wherein the processor circuit is configured to calculate the audible signal data based on the output force.

4. A system in accordance with claim 1, wherein the audio output circuit includes:
   a synthesizer circuit coupled to the processor circuit, the synthesizer circuit being configured to receive the audible signal data and output an analog signal in response thereto; and
   a speaker circuit coupled to the synthesizer circuit, the speaker circuit being configured to receive the analog signal and generate the audible signal in accordance with the analog signal.

5. A system in accordance with claim 4, wherein the audio output circuit includes:
   an audio control circuit coupled to the synthesizer circuit, the audio control circuit including a volume control circuit configured to adjust a volume associated with the audible signal; and
   a frequency control circuit configured to adjust a pitch associated with the audible signal.

6. A system in accordance with claim 1, wherein the audible signal is a first audible signal and the input signal is a first input signal, the processor circuit being configured to receive a second input signal associated with a second audible signal and incorporate interference data into the audible signal data, the audio output circuit being configured to generate the audible signal with a component signal in response to the audible signal data incorporating the interference data, the component signal interfering with the second audible signal.

7. A system in accordance with claim 6, further including a microphone configured to sense the second audible signal and supply the second input signal to the processor circuit.

8. A system in accordance with claim 1, wherein the machine includes a continuously variable transmission configured to deliver the output force against the load, and a power source coupled to the continuously variable transmission.

9. A system in accordance with claim 1, wherein the audible signal is audible to a user inside the machine.

10. The system of claim 1, wherein the vibration generator circuit is further configured to generate the vibrations in the machine such that the user inside the machine feels the vibrations.

11. A method for outputting an audible signal simulating a mechanical noise, the audible signal corresponding to output force generated by a machine against a load, the method comprising:
    generating an output force by the machine;
    sensing a pressure of a hydraulic fluid, the pressure being associated with the output force;
    generating an input signal in response to the sensed pressure;
    receiving the input signal associated with the output force;
    generating audible signal data based on the input signal; and
    generating the audible signal in response to the audible signal data.

12. A method in accordance with claim 11, further including:
    determining a value of the output force based on the input signal; and
    retrieving the audible signal data from a memory, the audible signal data corresponding to the value of the amount of the output force.

13. A method in accordance with claim 11, further including:
    determining a value of the output force based on the input signal; and
    calculating the audible signal data based on the value of the output force.

14. A method in accordance with claim 11, further including generating vibrations in the machine in response to the audible signal data.

15. A method in accordance with claim 11, wherein the audible signal is a first audible signal and the input signal is a first input signal, the method further including:
    receiving a second input signal associated with a second audible signal;
    incorporating interference data into the audible signal data;
    generating a component signal based on the interference data; and
    incorporating a component signal into the audible signal, the component signal interfering with the second audible signal.

16. The method of claim 11, further comprising outputting the hydraulic fluid from a hydraulic pump of a transmission of the machine.

17. A machine configured to operate on a load, the machine comprising:
- a power source;
- a transmission coupled to the power source;
- an implement coupled to the transmission and the load, the transmission being configured to deliver an output force to the implement and against the load;
- a sensor circuit coupled to the transmission and configured to sense a pressure of a hydraulic fluid associated with the transmission, the pressure being associated with the output force;
- a processor circuit configured to receive an input signal supplied by the sensor circuit in response to the sensed pressure and generate audible signal data based on the input signal; and
- an audio output circuit coupled to the processor circuit, the audio output circuit being configured to generate the audible signal in response to the audible signal data, the audible signal simulating a mechanical noise.

18. A machine in accordance with claim 17, wherein the power source includes at least one of an internal combustion engine, a fuel cell, or an electric drive motor.

19. A machine in accordance with claim 17, wherein:
the transmission includes:
- a hydraulic pump outputting the hydraulic fluid and being coupled to the power source, and
- a hydraulic motor configured to receive the hydraulic fluid, the hydraulic motor being coupled to the implement; and
the sensor circuit is a pressure sensor circuit coupled to the hydraulic pump, the pressure sensor circuit being configured to sense the pressure of the hydraulic fluid output from the hydraulic pump and supply the input signal to the processor circuit in response to the sensed pressure.

20. A machine in accordance with claim 17, wherein:
the transmission includes:
- a hydraulic pump outputting the hydraulic fluid and being coupled to the power source, and
- a valve configured to receive the hydraulic fluid and output the hydraulic fluid to a hydraulic cylinder, the hydraulic cylinder being coupled to the implement; and
the sensor circuit is a pressure sensor circuit coupled to the valve, the pressure sensor circuit being configured to sense the pressure of the hydraulic fluid output from the valve and supply the input signal to the processor circuit in response to the sensed pressure.

21. A machine in accordance with claim 17, wherein the transmission is a continuously variable transmission.

22. A system outputting an audible signal simulating a mechanical noise, the system comprising:
- a machine configured to output a force to manipulate a load and having a transmitter circuit and a sense circuit, the sense circuit including a pressure sensor configured to sense a pressure of a hydraulic fluid, the pressure being associated with the output force, the sense circuit being configured to supply the sensed pressure to the transmitter circuit, the transmitter circuit transmitting a signal carrying information related to the force output from the machine based on the sensed pressure;
- a receiver circuit remote from the machine, the receiver circuit being configured to receive the signal and output the information;
- a processor circuit coupled to the receiver circuit, the processor circuit being configured to output audible signal data based on the information; and
- an audio output circuit coupled to the processor circuit, the audio output circuit being configured to generate the audible signal in response to the audible signal data.

23. A system in accordance with claim 22, wherein the audible signal is audible to a user inside the machine.

* * * * *